(12) United States Patent
Schultz et al.

(10) Patent No.: US 8,246,816 B2
(45) Date of Patent: Aug. 21, 2012

(54) ZONE OR SYSTEM FOR PROVIDING ONE OR MORE STREAMS

(75) Inventors: Michael A. Schultz, Chicago, IL (US); Xin X. Zhu, Long Grove, IL (US)

(73) Assignee: UOP LLC, Des Plaines, IL (US)

( * ) Notice: Subject to any disclaimer, the term of this patent is extended or adjusted under 35 U.S.C. 154(b) by 614 days.

(21) Appl. No.: 12/397,943

(22) Filed: Mar. 4, 2009

(65) Prior Publication Data
US 2010/0224475 A1 Sep. 9, 2010

(51) Int. Cl.
*C10G 7/00* (2006.01)
*B01D 3/14* (2006.01)

(52) U.S. Cl. ............ 208/347; 203/71; 203/98; 203/99; 203/DIG. 19

(58) Field of Classification Search .......... 196/111; 202/154, 158, 173; 203/71, 78, 98, 99, DIG. 19; 208/347; 585/800
See application file for complete search history.

(56) References Cited

U.S. PATENT DOCUMENTS

| | | | |
|---|---|---|---|
| 3,907,511 A * | 9/1975 | Forbes et al. | 422/605 |
| 4,230,533 A * | 10/1980 | Giroux | 203/1 |
| 5,914,012 A | 6/1999 | Kaibel et al. | |
| 6,240,744 B1 * | 6/2001 | Agrawal et al. | 62/643 |
| 6,395,950 B1 | 5/2002 | Rice | |
| 6,472,578 B1 | 10/2002 | Rice | |
| 6,551,465 B1 | 4/2003 | Van Zile et al. | |
| 6,558,515 B1 | 5/2003 | Steacy | |
| 6,645,350 B1 | 11/2003 | Steacy | |
| 6,682,633 B1 * | 1/2004 | Xu et al. | 203/1 |
| 6,762,334 B1 | 7/2004 | Stewart et al. | |
| 6,846,389 B2 * | 1/2005 | Kaibel et al. | 203/1 |
| 7,249,469 B2 | 7/2007 | Porter | |
| 7,267,746 B1 | 9/2007 | Harris et al. | |
| 7,339,088 B1 | 3/2008 | O'Brien et al. | |
| 7,462,277 B2 | 12/2008 | Adrian et al. | |
| 2005/0121303 A1 | 6/2005 | de Graauw et al. | |
| 2005/0199482 A1 | 9/2005 | Heida | |
| 2005/0250965 A1 | 11/2005 | Bassler et al. | |
| 2006/0137967 A1 | 6/2006 | Kister et al. | |
| 2007/0043217 A1 | 2/2007 | Siegert et al. | |

(Continued)

FOREIGN PATENT DOCUMENTS

WO WO-2005/046831 A1 5/2005
(Continued)

OTHER PUBLICATIONS

Poth, Abstract of Minimal Energy Requirements of Dividing Wall Columns, 2004.
(Continued)

*Primary Examiner* — Virginia Manoharan
(74) *Attorney, Agent, or Firm* — James C. Pashall

(57) ABSTRACT

One exemplary embodiment can be a separation zone for separating a plurality of naphtha components. The separation zone can include first and second columns. The first column may include a dividing imperforate wall with one surface facing a feed and another surface facing a side stream. Typically, the wall extends a significant portion of the column height to divide the portion into at least two substantially vertical, parallel contacting sections. Also, the second column can communicate with the first column so as to provide a feed to or receive a feed from the first column. Generally, the second column is non-divided. The separation zone may provide at least four product streams.

13 Claims, 3 Drawing Sheets

U.S. PATENT DOCUMENTS

2010/0261928 A1* 10/2010 Dux et al. .................. 558/274
2012/0085682 A1* 4/2012 Schultz et al. ............... 208/363

FOREIGN PATENT DOCUMENTS

WO    WO-2008/091317 A2    7/2008

OTHER PUBLICATIONS

Christiansen et al., Complex Distillation Arrangements: Extending the Petlyuk Ideas, Computers and Chemical Engineering, May 1997, vol. 21, No. Suppl. 1, pp. S237-S242.

Ivanescu et al., Dividing Wall Column—a New Challenge for Separation Systems, 2004, p. 4.

Lestak et al., Advanced Distillation Saves Energy and Capital, Chemical Engineering, Jul. 1997, vol. 104, No. 7, pp. 72-76.

Mueller et al., Reactive Distillation in a Dividing Wall Column: Rate-Based Modeling and Simulation, Industrial and Engineering Chemistry Research, 2007, vol. 46, No. 11, pp. 3709-3719.

Mueller et al., Rate-Based Analysis of Reactive Distillation Sequences with Different Degrees of Integration, Chemical Engineering Science, 2007, vol. 62, No. 24, pp. 7327-7335.

Muralikrishna et al., Development of Dividing Wall Distillation Column Design Space for a Specified Separation, Chemical Engineering Research and Design, Mar. 2002, vol. 80, No. 2, pp. 155-166.

Poth et al., Minimal Energy Requirements of Dividing-Wall Columns, Chemie-Ingenieur-Technik, 2004, vol. 76, No. 12, pp. 1811-1814.

Serra et al., Controllability of Different Multicomponent Distillation Arrangements, Apr. 16, 2003, vol. 42, No. 8, pp. 1773-1782.

Serra et al., Dynamic Behavior and Controllability Issues in the Design and Operation of the Dividing Wall Column, Czech Society of Chemical Engineering 13th International Chemical and Process Engineering CHISA 98 Congress, 1998, vol. N.F1.5, p. 20.

Slade et al., Dividing Wall Column Revamp Optimises Mixed Xylenes Production, 2006, AICHE The 2006 Spring National Meeting, Orlando, FL, p. 6.

Suphanit et al., Exergy Loss Analysis of Heat Transfer Across the Wall of the Dividing-Wall Distillation Column, Energy, 2007, vol. 32, No. 11, pp. 2121-2134.

* cited by examiner

ZONE OR SYSTEM FOR PROVIDING ONE OR MORE STREAMS

FIELD OF THE INVENTION

This invention generally relates to a zone or system for providing one or more product streams.

DESCRIPTION OF THE RELATED ART

Generally, a fluid catalytic cracking unit can produce a naphtha stream that is typically split into three or four products. These products can include a light naphtha, a middle naphtha, an aromatics naphtha, and/or a heavy naphtha. Typically, the separation is accomplished with a direct sequence of two splitter columns for three products and three splitter columns for four products. However, it is desired to accomplish the production of products in a more efficient manner to reduce utility and capital costs associated with the separation. Consequently, an alternative scheme for producing products in a more efficient manner is highly desirable.

SUMMARY OF THE INVENTION

One exemplary embodiment can be a separation zone for separating a plurality of naphtha components. The separation zone can include first and second columns. The first column may include a dividing imperforate wall with one surface facing a feed and another surface facing a side stream. Typically, the wall extends a significant portion of the column height to divide the portion into at least two substantially vertical, parallel contacting sections. Also, the second column can communicate with the first column so as to provide a feed to or receive a feed from the first column. Generally, the second column is non-divided. The separation zone may provide at least four product streams.

Another exemplary embodiment may be a system for separating a plurality of naphtha components. Generally, the system includes a column, which may include a dividing imperforate wall with one surface facing a feed and another surface facing a plurality of side streams. Typically, the wall extends a significant portion of the column height to divide the portion into at least two substantially vertical, parallel contacting sections. The column can provide an overhead stream including a light naphtha, a first side stream including a medium naphtha, a second side stream including an aromatic naphtha, and a bottom stream including a heavy naphtha.

Yet another exemplary embodiment can be a system for separating a plurality of naphtha components. The system can include a first column and a second column. Generally, the first column can include a dividing imperforate wall with one surface facing a feed and another surface facing a side stream. The wall may extend a significant portion of the column height to divide the portion into at least two substantially vertical, parallel contacting sections. The second column can communicate with the first column so as to provide a feed to or receive a feed from the first column. Typically, the second column is non-divided, and the system may provide at least four product streams.

As disclosed by the embodiments depicted herein, the separation zone or system can provide a more efficient split of a hydrocarbon feed including a plurality of naphtha components. Particularly, the embodiments disclosed herein can provide an efficient manner for separating the feed with reduced utility and capital costs. The utilization of a dividing wall column either alone or in combination with another distillation column can efficiently provide the desired products.

DEFINITIONS

As used herein, the term "stream" can be a stream including various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "dividing wall column" generally means a column including a substantially fluid tight vertical wall extending through a significant portion of the column's height and located in a central portion of the column. Thus, a central portion of the column can be divided into at least two vertical, parallel vapor-liquid contacting sections. The top and bottom of the wall terminate in the column at a point distant from the respective end of the column such that there is open communication across the column interior at the top and bottom of the dividing wall.

As used herein, the term "non-divided column" generally means a column absent a dividing wall positioned substantially vertically within the column dividing a central portion into at least two vertical, parallel vapor-liquid contacting sections.

As used herein, the term "vapor" can mean a gas or a dispersion that may include or consist of one or more hydrocarbons.

As used herein, the term "naphtha components" generally means one or more hydrocarbons with not less than about 10%, by weight, distilling below about 175° C. and not less than about 95%, by weight, distilling below about 240° C. in accordance with ASTM-D86-08.

DETAILED DESCRIPTION

Figure 1:
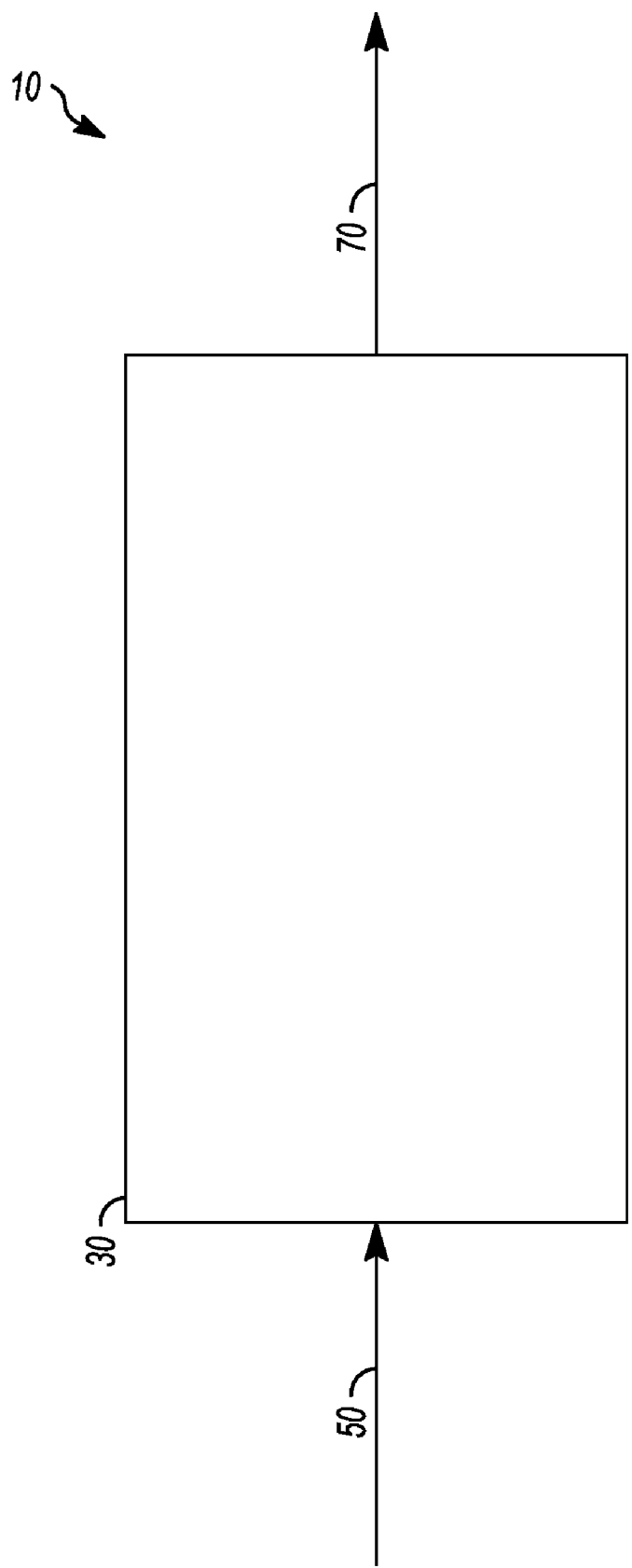
FIG. 1 is a schematic depiction of an exemplary system.

Referring to FIG. 1, a system 10 can include a separation zone 30 receiving a feed 50 and providing at least one product stream 70. Typically, the feed 50 can include a plurality of naphtha components. In addition, the at least one product stream 70 can include at least two, and preferably at least four product streams, which can be an overhead stream, at least one side stream, and a bottom stream as hereinafter described. Typically, these product streams can be a light naphtha (LN), a medium naphtha (MN), an aromatics naphtha (ARN), and a heavy naphtha (HN). The boiling points (BP) and true boiling points (TBP) as determined by ASTM D2892-05 are depicted in the following table:

TABLE 1

| Product Stream | BP (° C.) | TBP 10 (° C.) | TBP 90 (° C.) |
| --- | --- | --- | --- |
| LN | 20-80 | | 61 |
| MN | 80-150 | 56 | 102 |
| ARN | 150-215 | 102 | 158 |
| HN | at least about 215 | 162 | |

The embodiments as described herein can utilize a dividing wall column either in combination with a non-divided column or alone to produce at least four products. That is, the vapor leaving the top of each divided section and the liquid leaving the bottom of each divided section can flow into a common section and be admixed. Each section often contains fractionation trays and/or packing intended to promote separation. The feed stream to the column can enter on a first receiving side of a dividing wall section of the column. Alternatively, the feed may enter near the bottom of the receiving section. Exemplary dividing wall columns are disclosed in, e.g., U.S. Pat. Nos. 6,551,465 B1 and 6,558,515 B1.

Figure 2:
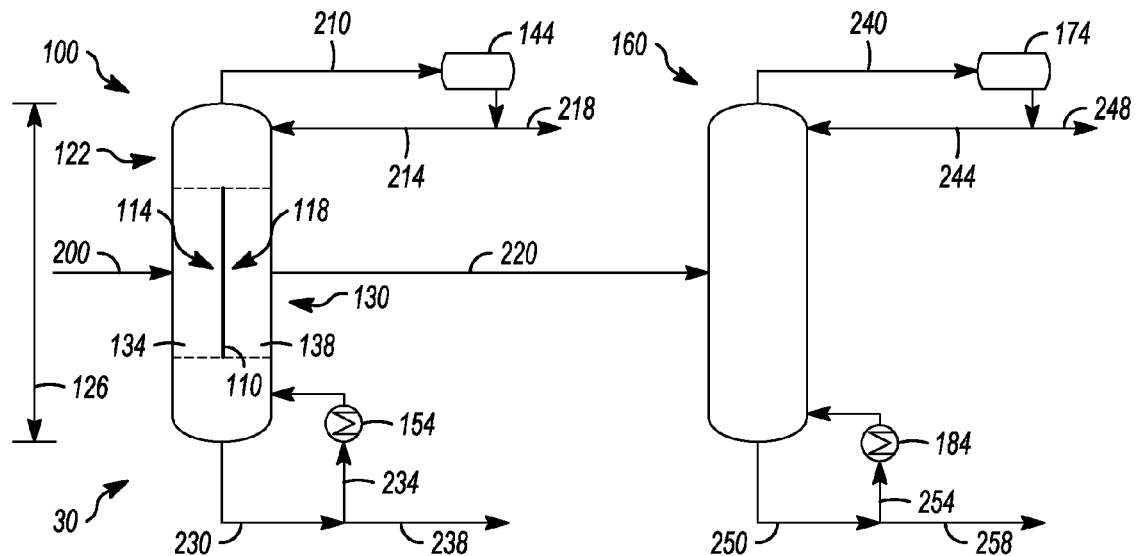
FIG. 2 is a schematic depiction of one exemplary separation zone.

The separation zone 30 can take several different forms. Referring to FIG. 2, one exemplary separation zone 30 can include a first column 100 and a second column 160. Typically, the first column 100 is a dividing wall column while the second column 160 is a non-divided column. Generally, the first column 100 can include a dividing imperforate wall 110, a receiver 144, and a heater 154. Typically, the dividing imperforate wall 110 has one surface 114 facing a feed 200 and another surface 118 facing a side stream 220. Generally, the wall 110 is a significant portion 122 of the column height 126. As a result, the wall 110 can divide the column 100 into at least two vertical, parallel contact sections 130. Particularly, a first section 134 can be on one side of the wall 110 and a second section 138 can be on the other. This divided column 100 can produce additional products as compared to a non-divided column.

Generally, the first column 100 can receive the feed 200. The lighter material in the feed 200 can exit the column as an overhead stream 210. Usually, the overhead stream 210 is sent to the receiver 144 where a portion is returned to the column 100 as a reflux 214 and another portion is a light naphtha product 218. In addition, a side stream 220 can be withdrawn from the column 100 that can include a medium naphtha and an aromatic naphtha. In addition, the bottom stream 230 can exit the column 100. Typically, a portion of the bottom stream 230 is a return 234 that passes through the heater 154, which is typically a reboiler. The heater or reboiler, including those described hereinafter, can operate, independently, with any suitable heat source, such as a furnace, pressurized steam, or another process stream. Another portion of the bottom stream 230 can exit as a bottom product 238, which is typically a heavy naphtha.

The separation zone 30 can also include a second column 160 that can receive the side stream 220 as a feed. Generally, the second column 160 can include a receiver 174 and a heater 184. Usually, the lighter material in the side stream 220 can rise in the second column 160 and exit as an overhead stream 240 that can be sent to the receiver 174. A reflux 244 can be returned to the column 160 while another portion from the receiver 174 can be withdrawn as a medium naphtha product 248.

The heavier material in the side stream 220 can pass to the bottom of the column 160 and exit as a bottom stream 250 with a portion as a return 254 passing through the heater 184 which is then returned to the column 160. Typically, the heater 184 is a reboiler. Another portion of the bottom stream 250 can be withdrawn as a bottom product 258, which is typically an aromatic naphtha.

Figure 3:
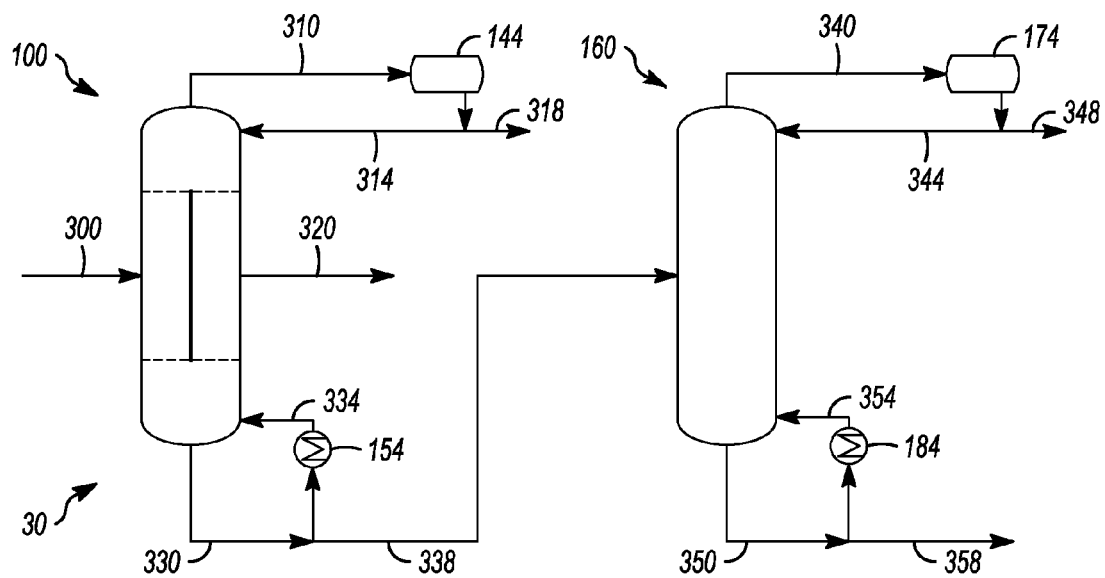
FIG. 3 is a schematic depiction of another exemplary separation zone.

Referring to FIG. 3, another exemplary separation zone 30 can include the first column 100 and the second column 160. In this instance, a feed 300 can be provided to the first column 100. The lighter material can exit the top of the column 100 as an overhead stream 310 that is sent to the receiver 144. Typically, a reflux 314 can be provided back to the column 100 with a light naphtha product 318 obtained from another portion from the receiver 144. In addition, a side stream 320 can be withdrawn that can be a medium naphtha. In addition, a bottom stream 330 can include an aromatic naphtha and a heavy naphtha. A portion of the bottom stream 320 can be sent through the heater 154 and provided to the column 100 as a return 334. Another portion of the bottom stream 330 or bottom product 338 can be provided as a feed to the second column 160.

Again, the lighter materials in the second column 160 can be withdrawn as an overhead stream 340 that is sent to the receiver 174. A portion of the overhead stream 340 can be returned to the column 160 as a reflux 344, and another portion of the overhead stream 340 can be withdrawn as an aromatic naphtha product 348. In addition, the heavier material in the column 160 can be withdrawn as a bottom stream 350. A portion of the bottom stream 350 can be a return 354 that passes through the heater 184 and is routed to the bottom of the column 160. In addition, another portion of the bottom stream 350 can be withdrawn as a bottom product 358, which can include a heavy naphtha.

Figure 4:
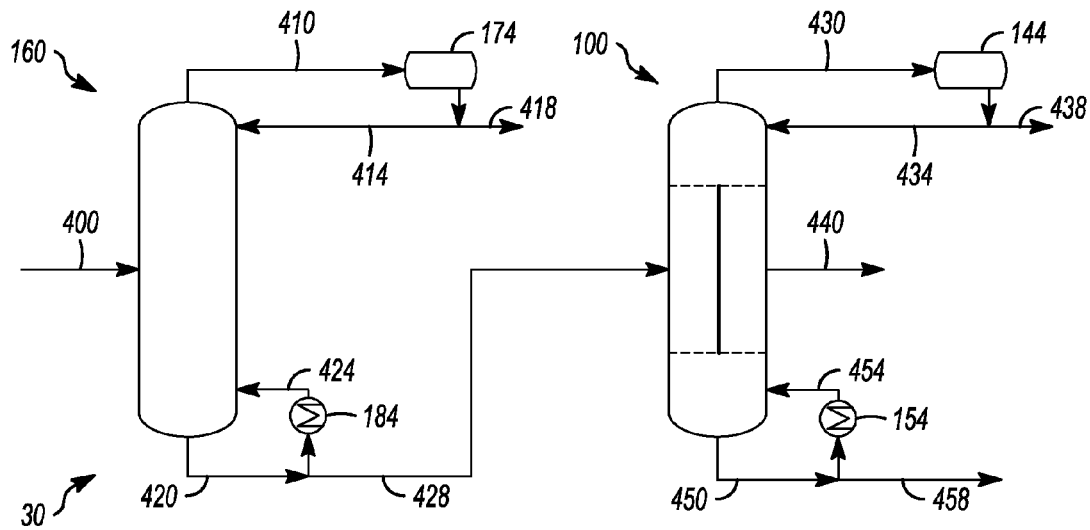
FIG. 4 is a schematic depiction of yet another exemplary separation zone.

Furthermore, another exemplary separation zone 30 is depicted in FIG. 4. In this exemplary embodiment, the second column 160 can be positioned before the first column 100. The first column 100 may have a receiver 144 and a heater 154, and a second column 160 having a receiver 174 and a heater 184, as described above. Particularly, a feed 400 can be provided to the second column 160 with the lighter material withdrawn as an overhead stream 410. The overhead stream 410 can be sent to the receiver 174 with a portion returned to the column 160 as a reflux 414, and another portion withdrawn as a light naphtha product 418. The heavier material in the second column 160 can be withdrawn as a bottom stream 420. The bottom stream 420 can include a medium naphtha, an aromatic naphtha, and heavy naphtha. A portion of the bottom stream 420 can be passed through the heater 184 and returned to the column 160 as a return 424. Another portion of the bottom stream 420 can be a bottom product 428 and act as a feed to the first column 100. The lighter material in the first column 100 can be withdrawn as an overhead stream 430 and be sent to the receiver 144. A portion can be returned to the column 100 as a reflux 434 with another portion withdrawn as a medium naphtha product 438. In addition, material can be withdrawn as a side stream 440. In this exemplary embodiment, the side stream 440 can be an aromatic naphtha. In addition, the heavier material can be withdrawn as a bottom stream 450 with a portion passed through the heater 154 as a return 454 to the column 100. In addition, another portion of the bottom stream 450 can be withdrawn as a bottom product 458. In this instance, the bottom product 458 can be a heavy naphtha.

Figure 5:
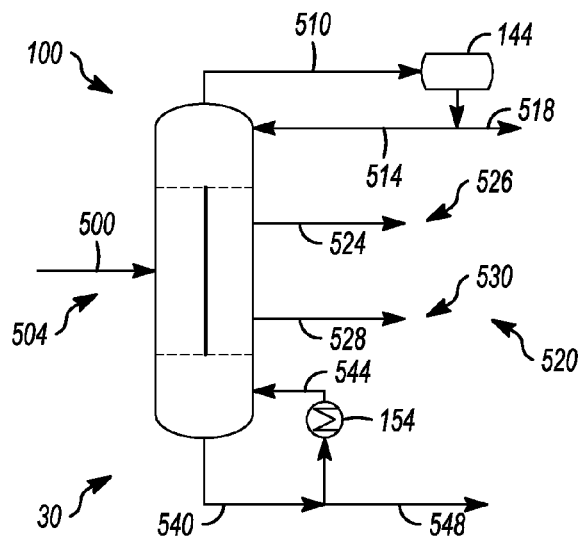
FIG. 5 is a schematic depiction of still another exemplary separation zone.

Referring to FIG. 5, yet another exemplary embodiment is depicted. In this exemplary embodiment, a single divided column 100 can be utilized. The column 100 can receive a feed 500 at a first elevation 504. Typically, several components can be in the feed 500. The lighter components can be withdrawn as an overhead stream 510 and be sent to the receiver 144. A portion can be returned to the column as a reflux 514 with another portion withdrawn as a light naphtha product 518. In addition, the first column 100 can produce a plurality of side streams 520. The plurality of side streams 520 can include a first side stream 524 at a first elevation 526, and a second side stream 528 at another elevation 530. Typically, the feed 500 is positioned at the first elevation 504 between the elevation 526 and the elevation 530. Usually, the first side stream 524 can include a middle naphtha and the second side stream 528 can include an aromatic naphtha. In addition, the heavier material in the first column 100 can be withdrawn as a bottom stream 540. A portion of the bottom stream 540 can be a return 544 that passes through the heater 154 before being routed to the bottom of the first column 100. In addition, another portion of the bottom stream 540 can be withdrawn as a bottom product 548, which in this exemplary embodiment can be a heavy naphtha.

gJ/hr: gigajoules per hour

Stgs: Number of Theoretical Stages

TABLE 2

| Examples | Column 1 | | Column 2 | | Column 3 | |
|---|---|---|---|---|---|---|
| | # Stgs | Column Diameter (meter) | # Stgs | Column Diameter (meter) | # Stgs | Column Diameter (meter) |
| Comp. Ex. 1 | 19 | 4.9 | 19 | 5.5 | 19 | 4.9 |
| Ex. 1 | 31 | 5.2 | 19 | 5.0 | | |
| Ex. 2 | 29 | 4.9 | 19 | 5.0 | | |
| Ex. 3 | 19 | 4.9 | 29 | 5.0 | | |
| Ex. 4 | 43 | 6.1 | | | | |

The duty and temperatures for each column are summarized for each example in Table 3 below.

TABLE 3

| Example | First Column in Series | | | | Second Column in Series | | | | Third Column in Series | | | |
|---|---|---|---|---|---|---|---|---|---|---|---|---|
| | Reb Q (gJ/hr) | Reb T (° C.) | Cond Q (gJ/hr) | Cond T (° C.) | Reb Q (gJ/hr) | Reb T (° C.) | Cond Q (gJ/hr) | Cond T (° C.) | Reb Q (gJ/hr) | Reb T (° C.) | Cond Q (gJ/hr) | Cond T (° C.) |
| Comp. Ex. 1 | 93 | 133 | 108 | 57 | 115 | 171 | 111 | 92 | 81 | 215 | 81 | 138 |
| Ex. 1 | 134 | 218 | 142 | 57 | 96 | 147 | 97 | 84 | | | | |
| Ex. 2 | 109 | 169 | 117 | 57 | 82 | 209 | 84 | 133 | | | | |
| Ex. 3 | 93 | 133 | 108 | 57 | 116 | 211 | 111 | 92 | | | | |
| Ex. 4 | 184 | 226 | 186 | 56 | | | | | | | | |

EXAMPLES

Several prophetic examples are made comparing different column orientations, as depicted in FIGS. 2-5 with a comparative example (hereinafter may be abbreviated "Comp. Ex. 1"). The comparative example consists of 3 non-divided columns in series to produce four products either as an overhead product or a bottoms product. No side stream products are withdrawn. Particularly, a feed can be provided to a first column with a light naphtha withdrawn overhead and the bottom product of the first column being sent to a second column. The second column can produce an overhead of a medium naphtha with the bottom product of the second column being sent to a third column. The third column can have an aromatic product withdrawn as an overhead and a heavy naphtha as a bottom product.

The examples as depicted in the following figures are abbreviated in the tables below along with other table abbreviations as follows:

Reboiler Duty: Reb Q

Reboiler Temperature: Reb T

Condenser Duty: Cond Q

Condenser Temperature: Cond T

A dividing wall column in a system as exemplified in Examples 1-4 provides greater overall efficiency with respect to the total reboiler and condenser duties of a series of columns. In the table below, the condenser duty error can be plus or minus 5%.

TABLE 4

| Example | Total Reb. Q (gJ/hr) | Total Cond Q (gJ/hr) |
|---|---|---|
| Comp. Ex. 1 | 289 | 300 |
| Ex. 1 | 230 | 239 |
| Ex. 2 | 191 | 202 |
| Ex. 3 | 209 | 218 |
| Ex. 4 | 184 | 186 |

Thus, a reduction in energy costs can be obtained when using a dividing wall column in a system as compared to using a series of conventional non-divided columns. As an example, the total energy requirement for alternative 4 can have a total reboiler duty 36.4% lower than Comparative Example 1.

In addition, a lower total reboiler duty can result in smaller column diameters, as well as requiring less heat exchange area in a reboiler and/or condenser, a smaller reflux pump, and a smaller overhead receiver. As a result, capital savings may also be obtained by having a system utilizing a more efficient column design.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for separating a plurality of naphtha components, comprising:
   A) feeding a first column, comprising a dividing imperforate wall with one surface facing a feed and another surface facing a side stream wherein the wall extends a significant portion of the column height to divide the portion into at least two substantially vertical, parallel contacting sections;
   B) providing a bottoms stream from a second column as a feed to a first column wherein the second column is non-divided; and
   C) providing at least four naphtha product streams and the first column provides a medium naphtha as an overhead stream, an aromatic naphtha as a side stream, and a heavy naphtha as a bottom stream.

2. The process according to claim 1, wherein the second column receives a side stream as a feed from the first column.

3. The process according to claim 2, wherein the second column provides a medium naphtha as an overhead stream and an aromatic naphtha as a bottom stream.

4. The process according to claim 1, wherein the second column receives a bottom stream as a feed from the first column.

5. The process according to claim 4, wherein the second column provides an aromatic naphtha as an overhead stream and a heavy naphtha as a bottom stream.

6. The process according to claim 1, wherein the second column provides a light naphtha as an overhead stream.

7. A process for separating a plurality of naphtha components, comprising:
   A) feeding a first column with a bottoms stream from a second column, said first column comprising a dividing imperforate wall with one surface facing a feed and another surface facing a plurality of side streams wherein the wall extends a significant portion of the column height to divide the portion into at least two substantially vertical, parallel contacting sections; and
   B) providing an overhead stream comprising a light naphtha, a first side stream comprising a medium naphtha, a second side stream comprising an aromatic naphtha, and a bottom stream comprising a heavy naphtha from said first column.

8. The process according to claim 7, further comprising passing the overhead stream through a receiver before at least a portion is returned to the first column as reflux and passing at least a portion of the bottom stream through a heater and returning it to the column.

9. The process according to claim 7, providing the feed at an elevation between the first side stream and the second side stream.

10. A process for separating a plurality of naphtha components, comprising:
    A) feeding naphtha components to a first column from a bottoms stream of a second column, comprising a dividing imperforate wall with one surface facing a feed and another surface facing a side stream wherein the wall extends a significant portion of the column height to divide the portion into at least two substantially vertical, parallel contacting sections, the first column providing a medium naphtha as an overhead stream, an aromatic naphtha as a side stream, and a heavy naphtha as a bottom stream;
    B) providing a light naphtha as an overhead stream from the second column wherein the second column is non-divided; and
    C) providing at least four product streams.

11. The process according to claim 10, wherein the second column receives a side stream as a feed from the first column.

12. The process according to claim 11, wherein the second column provides an aromatic naphtha as a bottom stream.

13. The process according to claim 10, wherein the second column receives a bottom stream as a feed from the first column.

* * * * *